United States Patent

Sumser et al.

[11] Patent Number: 5,372,485
[45] Date of Patent: Dec. 13, 1994

[54] EXHAUST-GAS TURBOCHARGER WITH DIVIDED, VARIABLE GUIDE VANES

[75] Inventors: Siegfried Sumser, Stuttgart; Erwin Schmidt, Baltmannsweiler; Wolfgang Erdmann, Stuttgart; Gerhard Fränkle, Remshalden, all of Germany

[73] Assignee: Mercedes-Benz AG, Stuttgart, Germany

[21] Appl. No.: 151,173

[22] Filed: Nov. 12, 1993

[30] Foreign Application Priority Data

Nov. 14, 1992 [DE] Germany ............... 4238550

[51] Int. Cl.⁵ ............................................. F02C 9/20
[52] U.S. Cl. ..................................... 417/407; 415/166
[58] Field of Search ............... 417/406, 407, 409; 415/165, 166; 60/605.1

[56] References Cited

U.S. PATENT DOCUMENTS

| 279,981 | 6/1883 | Raab | 415/166 |
|---|---|---|---|
| 2,755,628 | 7/1956 | Mamo | 415/166 |
| 2,935,295 | 5/1960 | Lepley . | |
| 3,137,477 | 6/1964 | Kofink . | |
| 3,162,421 | 12/1964 | Schwarz | 415/166 |
| 3,734,650 | 5/1973 | Reisacher et al. | 417/407 |
| 4,504,190 | 3/1985 | Beeloo | 415/166 |
| 4,907,952 | 3/1990 | Inoue et al. | 417/407 |

FOREIGN PATENT DOCUMENTS

| 362019 | 12/1906 | France | 415/166 |
|---|---|---|---|
| 1183580 | 7/1959 | France . | |
| 1380659 | 10/1964 | France . | |
| 91931 | 5/1897 | Germany | 415/166 |
| 911839 | 8/1951 | Germany | 415/166 |
| 820429 | 9/1951 | Germany | 415/166 |
| 390948 | 8/1965 | Germany . | |
| 2843202 | 4/1980 | Germany . | |
| 3427715 | 12/1985 | Germany . | |
| 20401 | 2/1905 | Sweden | 415/166 |
| 152272 | 10/1920 | United Kingdom | 415/166 |

OTHER PUBLICATIONS

European Search Report EP 93 10 4506 (Oct. 1993).

*Primary Examiner*—Timothy S. Thorpe
*Attorney, Agent, or Firm*—Evenson, McKeown, Edwards & Lenahan

[57] ABSTRACT

An exhaust-gas turbocharger for an internal-combustion engine, the exhaust-gas turbine of which comprises a rotor with an at leash partially diagonal throughflow direction and a spiral guide channel surrounding this and having a mouth region in the form of an angular nozzle, and a variable guide blade cascade with guide blades being arranged in the mouth region. In order to design guide blade cascades with a simpler construction than that of known versions, at the same time with an increase in their operational reliability, according to the invention the guide blades are divided in such a way that they form a divided guide blade cascade with a stationary guide-blade cascade part and with a guide-blade cascade part assigned to this and rotatable concentrically relative to the axis of rotation of the rotor.

16 Claims, 5 Drawing Sheets

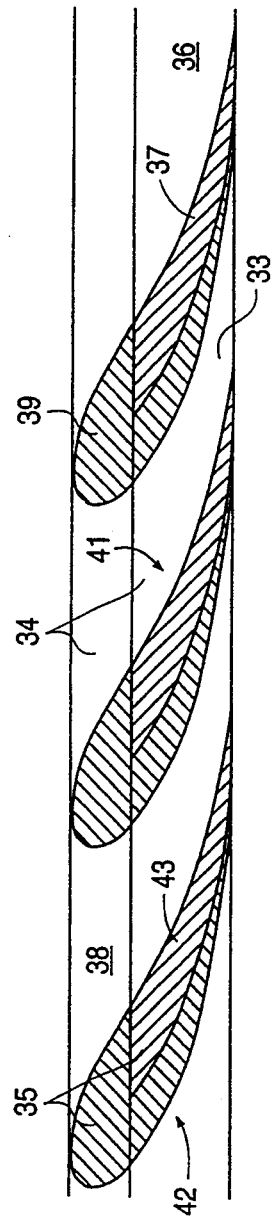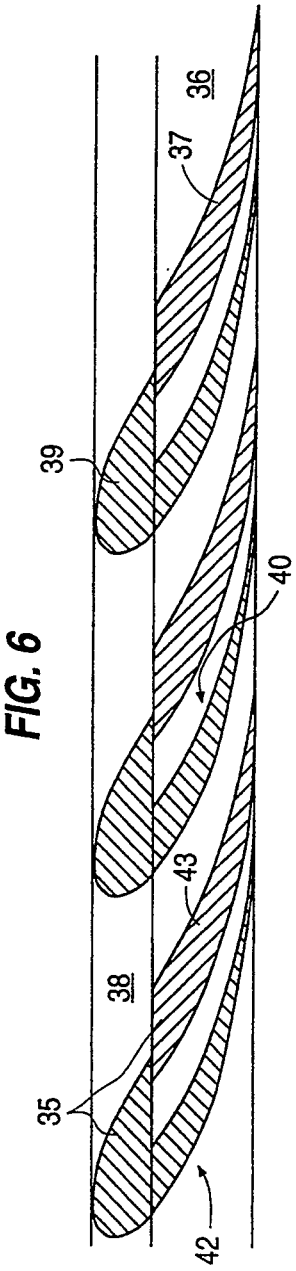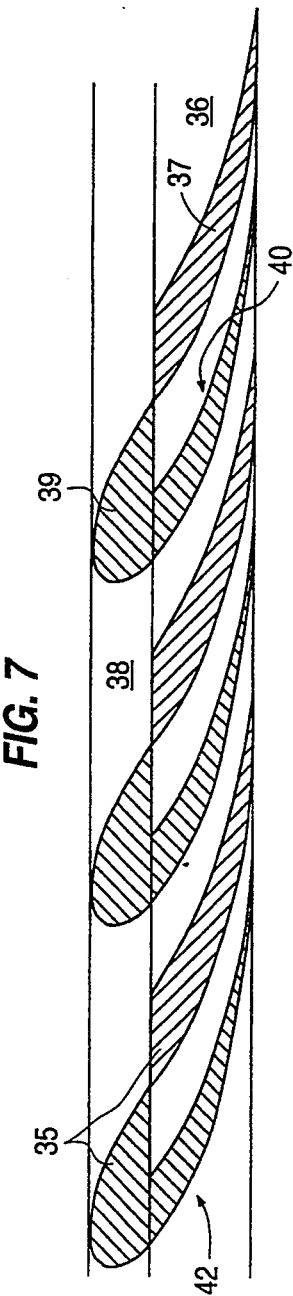

EXHAUST-GAS TURBOCHARGER WITH DIVIDED, VARIABLE GUIDE VANES

BACKGROUND AND SUMMARY

The invention relates to a variable guide blade cascade for an exhaust-gas turbocharger of an internal combustion engine, the turbine stage of which comprises at least one spiral diagonal flow with a mouth region in the form of an annular nozzle, which opens onto a rotor at the turbine stage and in which a variable guide blade cascade having guide blades is arranged.

A variable guide blade cascade for an exhaust-gas turbocharger of an internal-combustion engine of the relevant generic type is already known from German Patent Specification 3,427,715.

The exhaust-gas turbocharger possesses a double-flow spiral guide channel, one flow opening radially and the other flow diagonally onto the rotor. In the mouth region of each of the two flows opening onto the rotor are located variable guide blade cascades with undivided guide blades arranged on its circumference, each guide blade being mounted rotatably about a longitudinal guide-blade axis.

Furthermore, German unexamined published patent application 2,843,202 discloses an exhaust-gas turbocharger with a radial wheel which is surrounded by a spiral guide channel. Arranged in an axially fixed manner in the mouth region of the guide channel is an annular partition wall having nozzle-shaped perforations which are distributed on its circumference and which are inclined out of the direction tangential to the radial wheel towards the axis of the radial wheel. The annular partition wall is preceded by a circumferentially displaceable diaphragm, by means of which the cross-section of the nozzle-shaped perforations can be adjusted.

Hitherto known variable guide blade cascades of exhaust-gas turbochargers of the relevant generic type have a relatively complicated construction, since an adjustment mechanism is required for moving each individual guide blade of the guide blade cascade. Guide blade cascades of this type are therefore expensive and are operationally reliable only at a comparatively high outlay.

Furthermore, in the even of a pronounced reduction in the flow cross-section during the adjustment of the guide blades, considerable vibration problems occur on the guide blades as a result of the accelerated flow.

An object on which the invention is based is to design a guide blade cascade of the relevant generic type with simpler construction than that of known versions, at the same time with an increase in its operational reliability.

This object is achieved, according to the invention, by providing an arrangement wherein the turbine stage of which comprises at least one spiral diagonal flow with a mouth region in the form of an annular nozzle, which opens onto a rotor at the turbine stage and in which a variable guide blade cascade having guide blades is arranged.

One advantage of the arrangement according to the invention of the variable guide blade cascade is that an increase in operational reliability is achieved as a result of an appreciable reduction in the number of movable components of the guide blade cascade.

In preferred embodiments of the invention, the guide blades are divided along a plane extending parallel to a radial plane of the rotor, an arrangement which results in an especially simple and cost-effective version of the divided guide blade cascade.

In certain preferred embodiments of the invention, division of the guide blades take place respectively by means of two intersecting sectional faces, one sectional face being a plane parallel to a radial plane of the rotor and the other sectional face being approximately parallel to a skeleton face of the respective guide blade. In certain preferred embodiments of the invention, the guide-blade parts wherein the guide-blade parts of the stationary guide-blade cascade part are respectively formed by profiled segments, and wherein the guide-blade parts of the rotatable guide-blade cascade part have a guide-blade profile with guide-blade cutouts congruent to the stationary guide-blade parts. The guide-blade cutouts in the rotatable guide-blade cascade part are located on the delivery side of the guide blades, and wherein the guide-blade surface on the suction side of the guide blades is made continuous without a gap. With these arrangements with the guide blade cascade fully open, the dividing plane of the divided guide blade cascade is located on the delivery side of the guide blades which is at less risk of breakaway, since, as a result of the curvature of the delivery side of the guide blades, a flow breaking away in the region of their dividing plane tends to join the guide blades again downstream. The suction side of the guide blades which is at risk of breakaway is made continuous without a gap, in order, here, to prevent a local flow breakaway caused by a gap.

In certain preferred embodiments the throughflow cross-section of the flow channels of the guide blade cascade can be regulated in dependance on operating parameters of the internal-combustion engine by means of the rotatable guide-blade cascade part. By regulating the throughflow cross-section via the rotatable guide-blade cascade part the latter can also be used as an engine brake. With a suitable choice of the cascade, it can be designed so that, with the exception of gap streams, it can be blocked completely.

In exhaust-gas turbochargers, the turbine stage of which has a radial and a diagonal flow, the design according to certain preferred embodiments of the invention of the guide blade cascade is such that in a turbine stage which has a spiral radial flow in addition to the spiral diagonal flow, a divided guide blade cascade having divided guide blades is arranged in each of the two mouth regions of the flows the guide blade cascades each having a stationary guide-blade cascade part and a movable guide-blade cascade part assigned thereto and rotatable concentrically relative to the axis of rotation of the rotor, the rotatable guide-blade cascade parts being coupled rigidly. This design ensures an increase in the flexibility of the power regulation of the exhaust-gas turbocharger, at the same time with relatively simple construction and high operational reliability, in comparison with known exhaust-gas turbochargers.

The cascade parameters of the two guide blade cascades are coordinated with preferred operating points of the exhaust-gas turbocharger. The divided guide blade cascades can advantageously be set at preferred operating points of the exhaust-gas turbocharger by a coordination of their cascade parameters, for example by a suitable choice of the cascade division, of the blade profile, of the blade angle and of the position of the dividing face between the stationary and the rotatable guide-blade cascade part. Furthermore, the angle between the longitudinal blade axis and the longitudinal guide-blade cascade axis (so-called rake angle) can also be varied, with the result that the breakaway behavior of the exhaust-gas flow can be influenced in an advantageous way. By means of the cascade parameters, the throughflow cross-section of the divided guide blade cascades can also be adjusted in dependence of the rotary angle of the rotatable guide-blade cascade part.

Other objects, advantages and novel features of the present invention will become apparent from the following detailed description of the invention when considered in conjunction with the accompanying drawings.

BRIEF DESCRIPTION OF THE DRAWINGS

FIG. 5 shows a representation, similar to that of FIG. 2, of a second constructive embodiment of the guide blade cascade for a completely opened guide blade cascade;

FIG. 6 shows a representation, similar to that of FIG. 5, for a partially closed-off guide blade cascade;

FIG. 7 shows a representation, similar to that of FIG. 5, for a guide blade cascade closed off completely with the exception of gap streams;

DETAILED DESCRIPTION OF THE DRAWINGS

Figure 1:
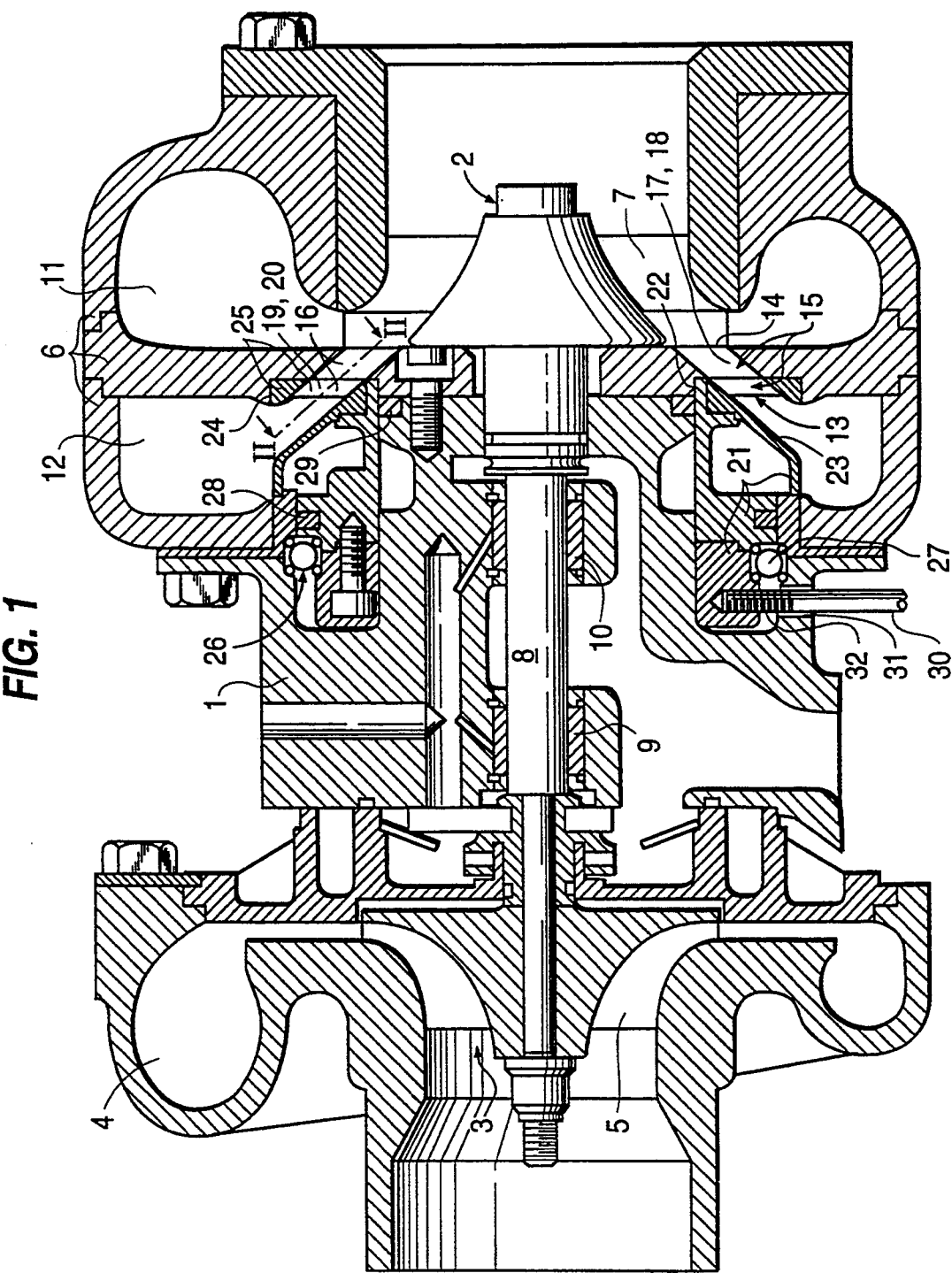
FIG. 1 shows a meridian section through an exhaust-gas turbocharger with a guide blade cascade constructed according to a preferred embodiment of the invention.

FIG. 1 shows a meridian section through an exhaust-gas turbocharger which comprises in a basically known way, a housing 1, a turbo stage 2 and a compressor stage 3.

Flanged to the housing 1, on the compressor side is a single-flow spiral guide channel 4 surrounding a radial impeller 5 of the compressor stage 3 and, on the turbine side, a double-flow spiral guide channel 6 surrounding a rotor 7 of the turbine stage 2, the rotor having a radial and a diagonal flow passing through it.

The radial impeller 5 and the rotor 7 are seated on a common shaft 8 which is mounted in the housing 1 by means of hydraulic radial bearings 9 and 10.

The double-flow spiral guide channel 6 consists of a first flow channel 11, the exhaust-gas stream of which loads the rotor 7 radially, and of a second flow channel 12 which has a mouth region 13 in the form of an annular nozzle and the exhaust-gas stream of which flows diagonally onto the rotor 7 on its end face 14 located on the shaft side.

Figure 2:
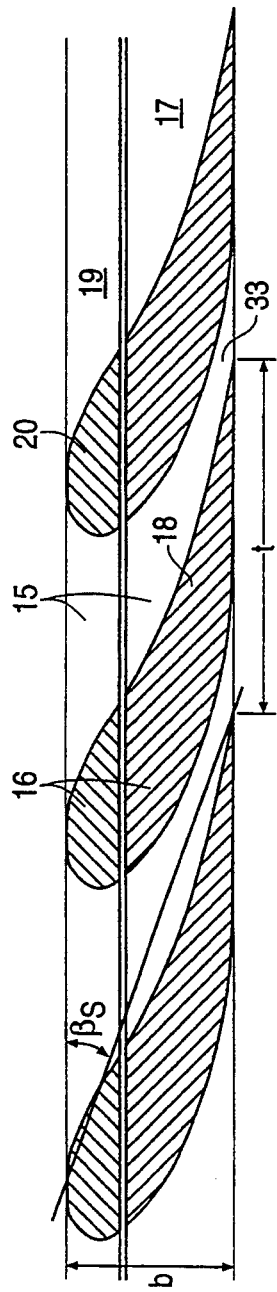
FIG. 2 shows a part, indicated by the line II—II in FIG. 1 and FIG. 8, of a developed view of a first constructive embodiment of the guide blade cascade according to the invention for a completely opened guide blade cascade.

Located in the mouth region 13 in the form of an annular nozzle of the second flow channel 12, is a variable, continuously adjustable, divided guide blade cascade 15 having guide blades 16 which are divided by a plane extending parallel to a radial plane of the rotor 7 (see FIG. 2). The divided guide blades 16 constitute the divided guide blade cascade 15 which is formed by a stationary guide-blade cascade part 17 with guide-blade parts 18 and by a guide-blade cascade part 19 assigned to this, rotatable concentrically relative to the axis of rotation of the rotor 7 and having guide-blade parts 20, the rotatable guide-blade cascade part 19 being arranged on the on-flow side and the stationary guide-blade cascade part 17 on the flow-off side in the mouth region 13.

The rotation of the guide-blade cascade part 19 takes place via a hub 21 with a hub connection piece 22. Fastened on the hub connection piece 22 is a conical hub part 23 which, together with a guide-blade cascade part 19 and an inner conical annular disc 24, forms a guide blade dividing rim 25.

The hub 21 is mounted in the housing 1 by means of a wire-race ball-bearing 26 with ceramic or steel balls 27.

The housing 1 and the hub 21 are sealed off relative to the gas side by means of rectangular cross-section rings 28 and 29.

The rotation of the hub 21 takes place via a pin 30 which is guided via a slot 31 of the housing 1 and which is firmly connected to the hub 21 by means of a thread 32.

The pin 30 is connected to an actuator (not shown) which regulates the position of the hub 21 and therefore the position of the guide-blade dividing rim 25 and of the guide-blade cascade part 19 rotatable together with the latter, in dependence on operating parameters of the internal-combustion engine.

Figure 3:
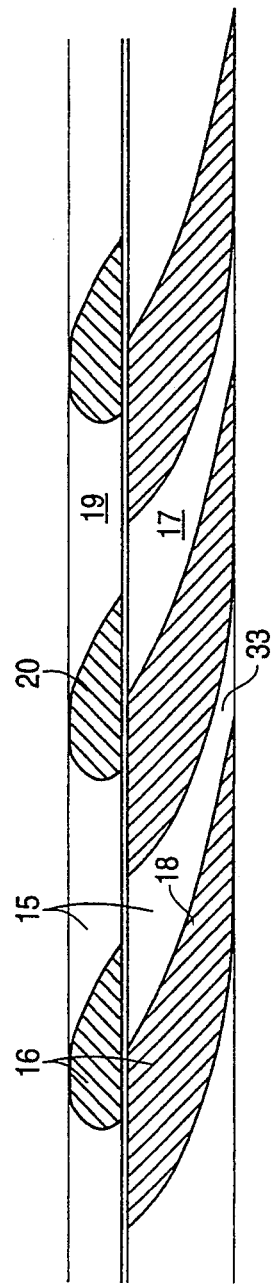
FIG. 3 shows a representation, similar to that of FIG. 2, for a partially closed-off guide blade cascade.
Figure 4:
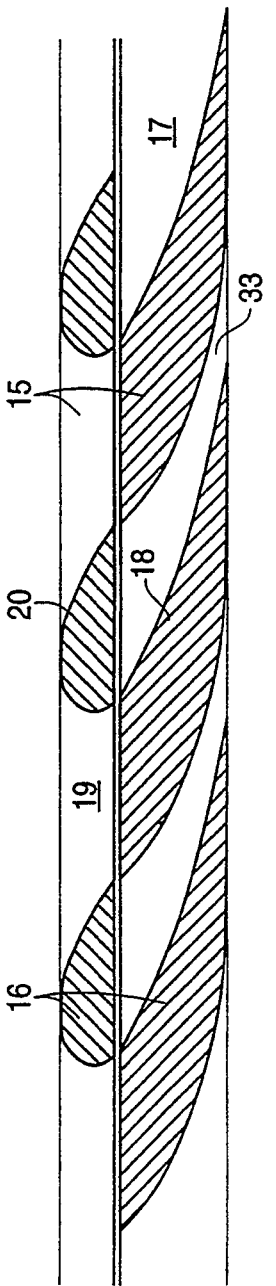
FIG. 4 shows a representation, similar to that of FIG. 2, for a guide blade cascade closed off completely with the exception of gap streams.
Figure 8:
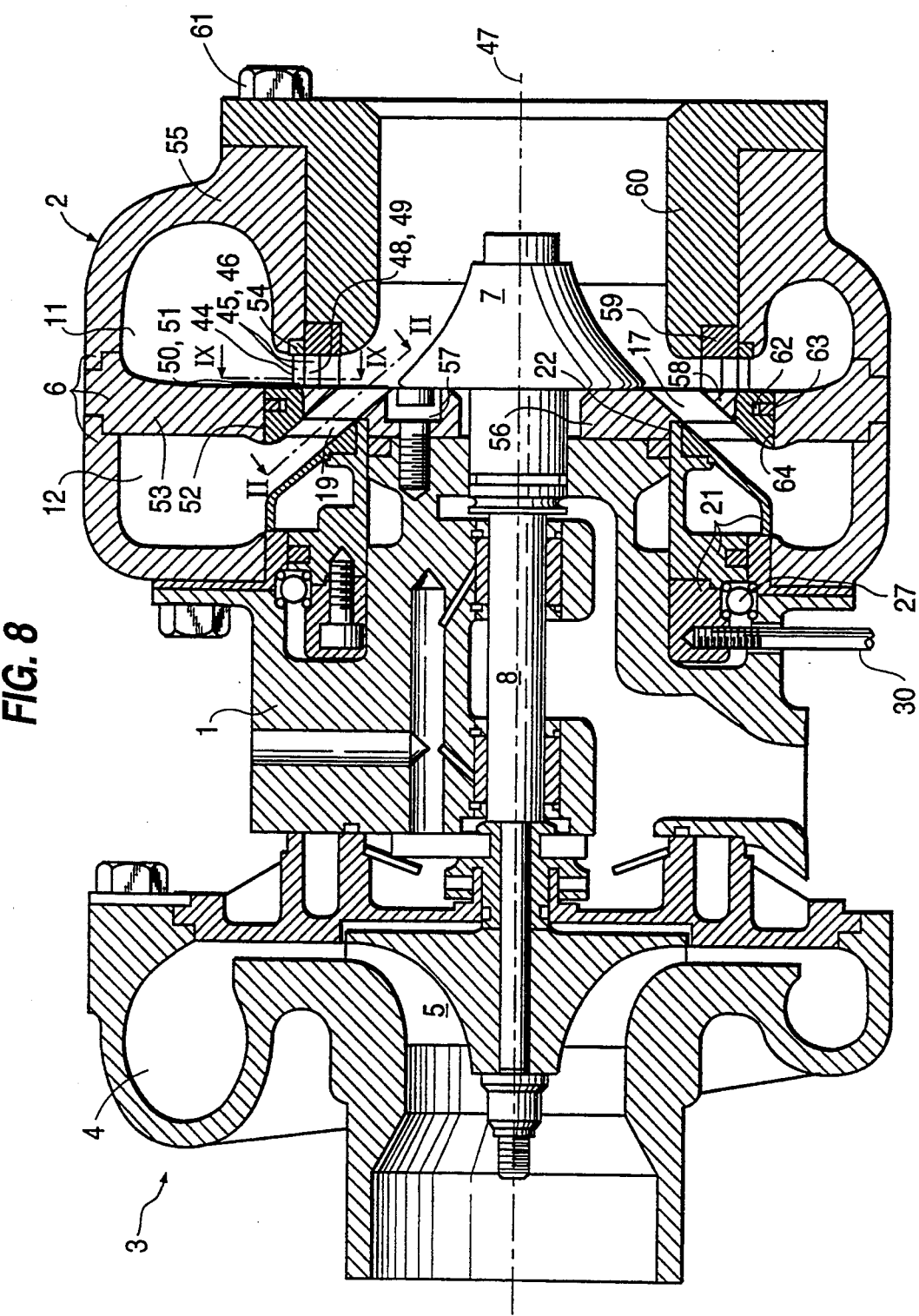
FIG. 8 is a view similar to FIG. 1, which shows a meridian section through an exhaust-gas turbocharger with two divided guide blade cascades, the rotatable guide-blade cascade parts of which are coupled rigidly, constructed according to preferred embodiments of the invention.

FIGS. 2, 3 and 4 show part of a developed view of the guide blade cascade 15 divided according to the invention parallel to a radial plane of the rotor 7, for three cascade positions of the rotatable guide-blade cascade part 19, according to the section II—II from FIG. 1 and FIG. 8.

FIG. 2 shows the guide blade cascade 15 with flow channels 33 and the cascade parameters of blade angle $\beta_s$, blade geometry, cascade division t and cascade width b. In the representation shown, the guide blade cascade 15 is completely opened, this corresponding, for example, to the guide-blade cascade position when the internal-combustion engine is under full load.

FIG. 3 shows a position of the rotatable guide-blade cascade part 19 for a part-load mode of the internal-combustion engine. The flow channels 33 of the guide blade cascade 15 are partially closed off as a result of the rotation of the guide-blade cascade part 19.

FIG. 4 shows a guide blade cascade 15 closed off completely with the exception of gap streams. The capacity for closing off the flow channels 33 of the guide blade cascade 15 is achieved by means of cascade parameters suitably coordinated with one another and the position of the dividing plane of the guide blade cascade 15. In the representation, the rotatable entry region of the cascade amounts to approximately ⅓ of the cascade width b at the relatively acute blade angles necessary for accelerating cascades. The main acceleration of the flow takes place in the stationary guide-blade cascade part 17.

FIGS. 5, 6 and 7 show an aerodynamically advantageous version of a divided guide blade cascade 34 with guide blades 35 for three cascade positions "open", "partially closed off" and "completely closed off" (similar to FIGS. 2, 3 and 4). The guide blade cascade 34 possesses a stationary guide-blade cascade part 36 with guide-blade parts 37 and a rotatable guide-blade cascade part 38 assigned to this and having guide-blade parts 39.

The division of each of the guide blades 35 takes place by means of two intersecting sectional faces, one sectional face being a plane extending parallel to a radial plane of the rotor 7 and the other sectional face being approximately parallel to the skeleton face of the respective guide blade 35.

The guide-blade parts 37 and the stationary guide-blade cascade part 36 are formed respectively by profiled segments 43, and the guide-blade parts 39 of the rotatable guide-blade cascade part 38 possess a guide-blade profile with guide-blade cutouts 40 congruent to the stationary guide-blade parts 37.

The guide-blade cutouts 40 are located in the rotatable guide-blade cascade part 38 on the delivery side 41 of the guide blades 35. The guide-blade surface on the suction side 42 of the guide blades 35 is made continuous without a gap.

The guide-blade cascade arrangement shown in FIG. 1 can, of course, also be used in a single-flow turbine stage with a diagonal flow through the rotor.

FIG. 8 shows a meridian section through an exhaust-gas turbocharger similar to that of FIG. 1. Like components are designated by the same reference numerals.

The first flow channel 11 with its annular mouth region 44 loads the rotor 7 radially. Located in the annular mouth region 44 is a variable, continuously adjustable, divided guide blade cascade 45 having guide blades 46 which are divided by an outer cylindrical surface arranged concentrically relative to the longitudinal rotor axis 47. The divided guide blades 46 constitute the divided guide blade cascade 45 which consists of a stationary guide-blade cascade part 48 with guide-blade parts 49 and of a moveable guide-blade cascade part 50 assigned to this, rotatable concentrically relative to the longitudinal rotor axis 47 and having guide-blade parts 51, the rotatable guide-blade cascade part 50 being arranged on the on-flow side and the stationary guide-blade cascade I part 48 on the flow-off side in the mouth region 44.

The two rotatable guide-blade cascade parts 19 and 50 are fastened to a connecting ring 52 which is guided rotatably in a housing intermediate wall 53. Located in a groove 6a of the connecting ring 52 i8 a ceramic sealing ring 63 which seals off the connecting ring 52 relative to the inside 64 of the housing intermediate wall. Fastened on the side of the guide-blade cascade part 50 facing away from the connecting ring 52 is a bearing ring 54 which is mounted rotatably in a housing part 55 of the turbine stage 2.

An annular plate 56 having the guide-blade cascade part 17 arranged on its circumference is fastened to the housing 1 by means of screws 57. Fastened on the side of the stationary guide-blade cascade part 17 facing the connecting ring 52 is a conical annular disc 58, to which the stationary guide-blade cascade part 48 of the divided guide blade cascade 45 is connected. The stationary guide-blade cascade part 48 is connected, on its end face facing away from the conical annular disc 58, to a cylindrical ring 59 fastened to a contour ring 60 which is firmly connected to the housing part 55 by means of screws 61.

The annular plate 56, the two stationary guide-blade cascade parts 17 and 48, the cylindrical ring 59 and the conical annular disc 58 are thus firmly connected in one piece with one another.

Figure 9:
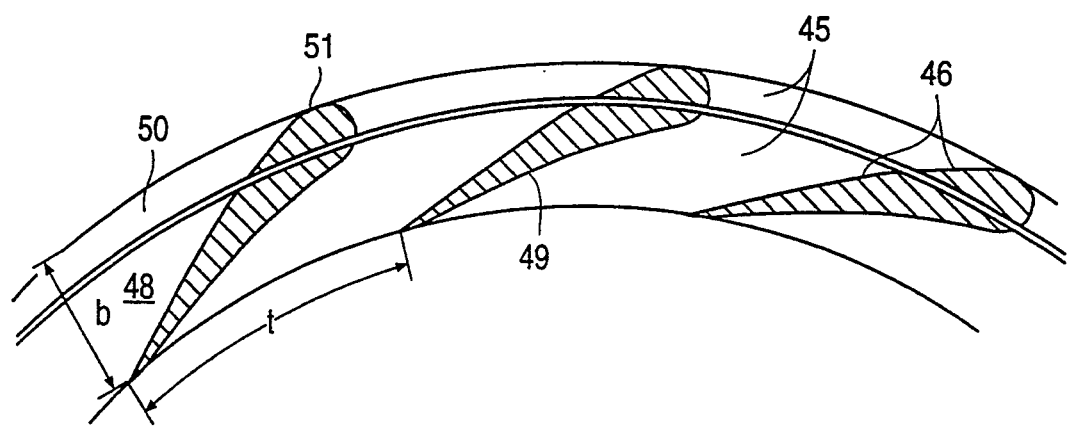
FIG. 9 shows a radial part section, indicated by the line IX—IX in FIG. 8, of a constructive embodiment of the radial guide blade cascade according to the invention for a completely opened guide blade cascade.

FIG. 9 shows a radial part section, indicated by the line IX—IX in FIG. 8, of a constructive embodiment of the completely opened divided guide blade cascade 45.

Figure 10:
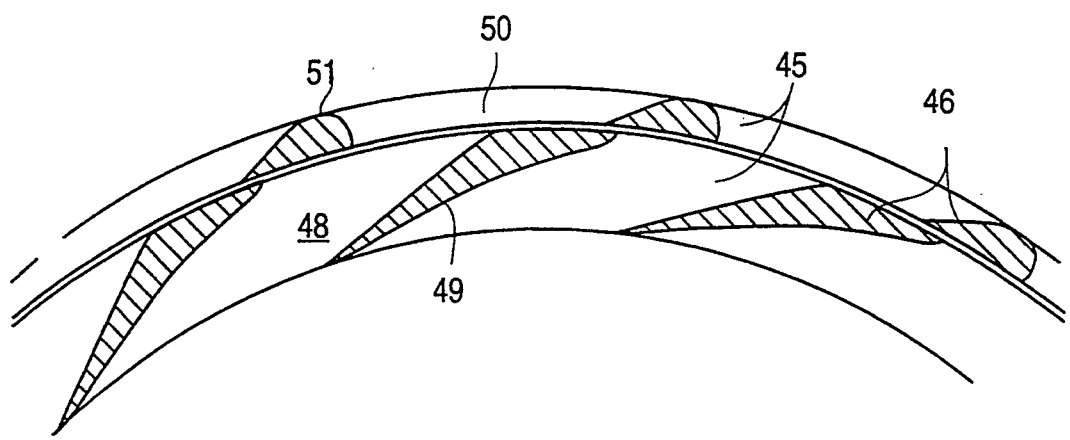
FIG. 10 shows a representation, similar to that of FIG. 9, for a partially closed-off radial guide blade cascade.

FIG. 10 shows the divided guide blade cascade 45 in a partially blocked position, that is to say approximately the position of the guide blade cascade 45 for the part-load mode of the internal-combustion engine. Thus, in a double-flow exhaust-gas turbine according to FIG. 8, the guide-blade cascade positions according to FIGS. 3 and 10 would be characteristic of this operating state.

In further contemplated embodiments of the invention, the stationary guide-blade cascade part can be arranged on the on-flow side and the rotatable guide-blade cascade part on the flow-off side.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An exhaust gas turbo charger for an internal combustion engine, comprising:
    a turbine stage including a turbine rotor rotatable about a turbine rotor axis and including turbine blades mounted on the turbine rotor,
    an annular double flow spiral guide channel having a first flow channel exhausting radially toward the turbine blades to drive the turbine rotor and a second flow channel exhausting diagonally toward the turbine rotor to drive the turbine rotor,
    and a variable guide blade cascade assembly for guiding gas flow from the double flow spiral guide channel to the turbine blades, said variable guide blade cascade assembly being a divided guide blade cascade including:
    a first stationary guide-blade cascade part including a plurality of first stationary guide-blades interposed between the first flow channel and the turbine blades,
    a first movable guide-blade cascade part including a plurality of first movable guide blades interposed between the first flow channel and the turbine blades,
    a second stationary guide-blade cascade part including a plurality of second stationary guide-blades interposed between the second flow channel and the turbine blades, and
    a second movable guide-blade cascade part including a plurality of second movable guide blades interposed between the second flow channel and the turbine blades,
    said movable guide-blade cascade parts being rotatable concentrically relative to the turbine rotor axis to thereby adjust flow cross-section for gas supplied from the first and second flow channels to the turbine blades, wherein said first and second movable guide-blade cascade parts are rigidly connected with one another.

2. Exhaust-gas turbocharger according to claim 1, wherein the rotatable guide-blade cascade parts are arranged upstream of the stationary guide-blade cascade parts.

3. Exhaust-gas turbocharger according to claim 1, wherein the width of the rotatable guide-blade cascade parts is approximately one third of the respective cascade width.

4. Exhaust-gas turbocharger according to claim 1, wherein respective stationary and movable guide blades of the first cascade parts are separated from one another along a plane extending parallel to a radial plane of the rotor.

5. Exhaust-gas turbocharger according to claim 1, wherein respective stationary and movable guide blades of the first cascade parts are separated from one another along two intersecting sectional faces, one sectional face being in a plane parallel to a radial plane of the rotor and the other sectional face being in a plane approximately parallel to a skeleton face of the respective guide blade.

6. Exhaust-gas turbocharger according to claim 5, wherein the guide-blades of the first stationary guide-blade cascade part are respectively formed by profiled segments, and wherein the guide-blades of the first rotatable guide-blade cascade part have a guide-blade profile with guide-blade cutouts congruent to the stationary guide-blade parts.

7. Exhaust-gas turbocharger according to claim 6, wherein the guide-blade cutouts in the rotatable guide-blade cascade part are located on the downstream side of the guide blades, and wherein the guide-blade surface on the downstream suction side of the guide blades is made continuous without a gap.

8. Exhaust-gas turbocharger according to claim 1, comprising means for adjusting the throughflow cross-section of flow channels of the guide blade cascades in dependence on operating parameters of the internal-combustion engine by means of rotation of the rotatable guide-blade cascade parts.

9. Exhaust-gas turbocharger according to claim 1, comprising means for controlling the throughflow cross-section of flow channels of the guide blade cascade in dependence on operating parameters of the exhaust-gas turbocharger by means of rotation of the rotatable guide-blade cascade parts.

10. Exhaust-gas turbocharger according to claim 1, wherein the width of the rotatable guide-blade cascade parts is approximately one third of the respective cascade width.

11. Exhaust-gas turbocharger according to claim 1, wherein respective stationary and movable guide blades of the second cascade parts are separated from one another along a radial plane of the rotor.

12. Exhaust-gas turbocharger according to claim 2, wherein respective stationary and movable guide blades of the second cascade parts are separated from one another along a radial plane of the rotor.

13. Exhaust-gas turbocharger according to claim 1, wherein the first stationary guide blades are disposed upstream of the first movable guide blades.

14. Exhaust-gas turbocharger according to claim 1, wherein the second stationary guide blades are disposed upstream of the second movable guide blades.

15. Exhaust-gas turbocharger according to claim 13, wherein the second stationary guide blades are disposed upstream of the second movable guide blades.

16. Exhaust-gas turbocharger according to claim 1, wherein said first and second stationary guide blade cascade parts are fixed to one another.

* * * * *